United States Patent
Chan et al.

(10) Patent No.: US 8,397,751 B1
(45) Date of Patent: Mar. 19, 2013

(54) VORTEX REDUCER

(75) Inventors: Kok Leong Chan, Penang (MY); Say Wei Pang, Penang (MY)

(73) Assignee: WD Media, Inc., San Jose, CA (US)

( * ) Notice: Subject to any disclaimer, the term of this patent is extended or adjusted under 35 U.S.C. 154(b) by 414 days.

(21) Appl. No.: 12/761,340

(22) Filed: Apr. 15, 2010

(51) Int. Cl.
*E03B 11/00* (2006.01)

(52) U.S. Cl. ........................................ 137/590

(58) Field of Classification Search ............ 137/590; 251/127
See application file for complete search history.

(56) References Cited

U.S. PATENT DOCUMENTS

| | | | |
|---|---|---|---|
| 4,170,047 A | 10/1979 | Corsette et al. | |
| 4,253,490 A | 3/1981 | Hansel | |
| 4,394,966 A | 7/1983 | Snyder et al. | |
| 4,442,858 A * | 4/1984 | Everett | 137/207 |
| 4,534,655 A | 8/1985 | King et al. | |
| 4,840,192 A * | 6/1989 | Yandle, II | 137/68.23 |
| 5,341,523 A | 8/1994 | Barnes | |
| 5,830,515 A * | 11/1998 | Pleasant et al. | 425/192 R |
| 6,014,987 A | 1/2000 | List et al. | |
| 6,382,233 B1 * | 5/2002 | Yandle, II | 137/68.23 |
| 6,536,468 B1 | 3/2003 | Wilmer et al. | |
| 6,840,275 B2 | 1/2005 | Grayson | |
| 2009/0206044 A1 | 8/2009 | Van Toever | |

* cited by examiner

*Primary Examiner* — John Rivell
*Assistant Examiner* — Kevin E Lynn

(57) ABSTRACT

A vortex reducing apparatus and method for drainage of a process tank are described. The vortex reducer including a keel having a longitudinal axis, a top flow foil coupled to the keel and a bottom flow foil coupled to the keel. The top flow foil and the bottom flow foil are each coupled to the keel at a first angle with respect to the longitudinal axis.

19 Claims, 4 Drawing Sheets

VORTEX REDUCER

TECHNICAL FIELD

Embodiments described herein relate to the field of processing equipment, more particularly, to a vortex reducer in a process tank.

BACKGROUND

During a series of magnetic recording disk manufacturing operations, a variety of process tanks are be used in the fabrication of a magnetic recording disk, or media. A dip lubrication of the magnetic recording disk, performed on the backend of the fabrication process, utilizes a process tank containing a lubricant for the dipping process. One particular type of lube dipper machine is referred to as a Midas Dipper manufactured by Ixmation.

The Midas Dipper is used to apply a layer of lubricant of a desired thickness onto the surface of the media. The dip lubrication process involves immersing a disk into the process tank containing a solvent and lubricant, and then pulling the disk out off the tank to cause lubricant of a certain thickness to remain on the disk.

At various times during the manufacturing process (e.g., after a certain number of media have been processed), the dipper's process tank is drained of the solvent and lubricant contained therein at a certain flow rate, for example, of approximately 15 gallons per minute (gpm). During the draining of the Midas Dipper's process tank, a vortex forms above the drain outlet of the tank, as illustrated in FIG. 1.

One problem with such a vortex formation is that it results in a longer drain time and also an inconsistent drain time between different drain operations. Another problem with such a vortex formation is that it causes air to be trapped in the drainage pipe line that runs to an electric pump. The trapping of air in the electric pump results in what is referred to as a "hot run" during the draining process. In a hot run, the head seal of the electric pump may over heat and, thereby, cause the pump to fail. Such pump failure results not only in pump repair costs but also in machine downtime to perform the pump repair in which the machine cannot be used for production manufacturing.

BRIEF DESCRIPTION OF THE DRAWINGS

Embodiments are illustrated by way of example, and not limitation, in the figures of the accompanying drawings in which.

DETAILED DESCRIPTION

Embodiments of the apparatus and methods are described herein with reference to figures. However, particular embodiments may be practiced without one or more of these specific details, or in combination with other known methods, materials, and apparatuses. In the following description, numerous specific details are set forth, such as specific materials, dimensions and processes parameters etc. to provide a thorough understanding. In other instances, well-known manufacturing processes and equipment have not been described in particular detail to avoid unnecessarily obscuring the claimed subject matter. Reference throughout this specification to "an embodiment" means that a particular feature, structure, material, or characteristic described in connection with the embodiment is included in at least one embodiment of the invention. Thus, the appearances of the phrase "in an embodiment" in various places throughout this specification are not necessarily referring to the same embodiment. Furthermore, the particular features, structures, materials, or characteristics may be combined in any suitable manner in one or more embodiments.

Embodiments of a vortex reducing apparatus and process tank in which it is used are described. Although embodiments of process tank may be described herein in regards to a dipper machine, the vortex reducing apparatus and methods may also be used with process tank of other machines and operations (e.g., a clean operation). Although embodiments of the present invention may, at times, be described in the in the context of the fabrication of magnetic recording disks, it should be appreciated that embodiments of the present invention may also be used for the operations on semiconductor wafers or other types of workpieces. The term "workpiece" as used herein may include substrates, semiconductor wafers, photomasks, magnetic recording disks, optical discs, glass substrates, flat panel display surfaces, liquid crystal display surfaces, etc.

Figure 1:
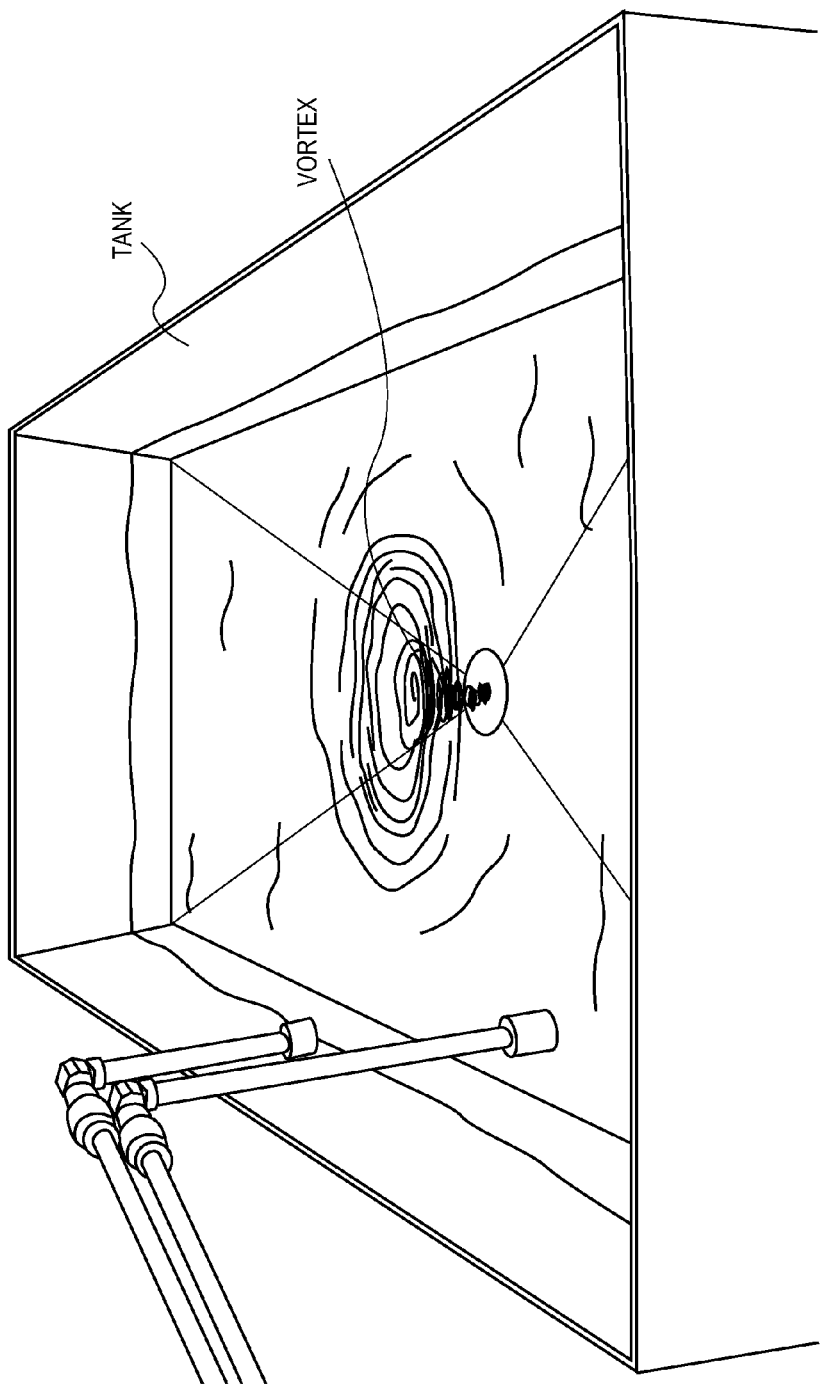
FIG. 1 illustrates a vortex formation in a conventional process tank.
Figure 2:
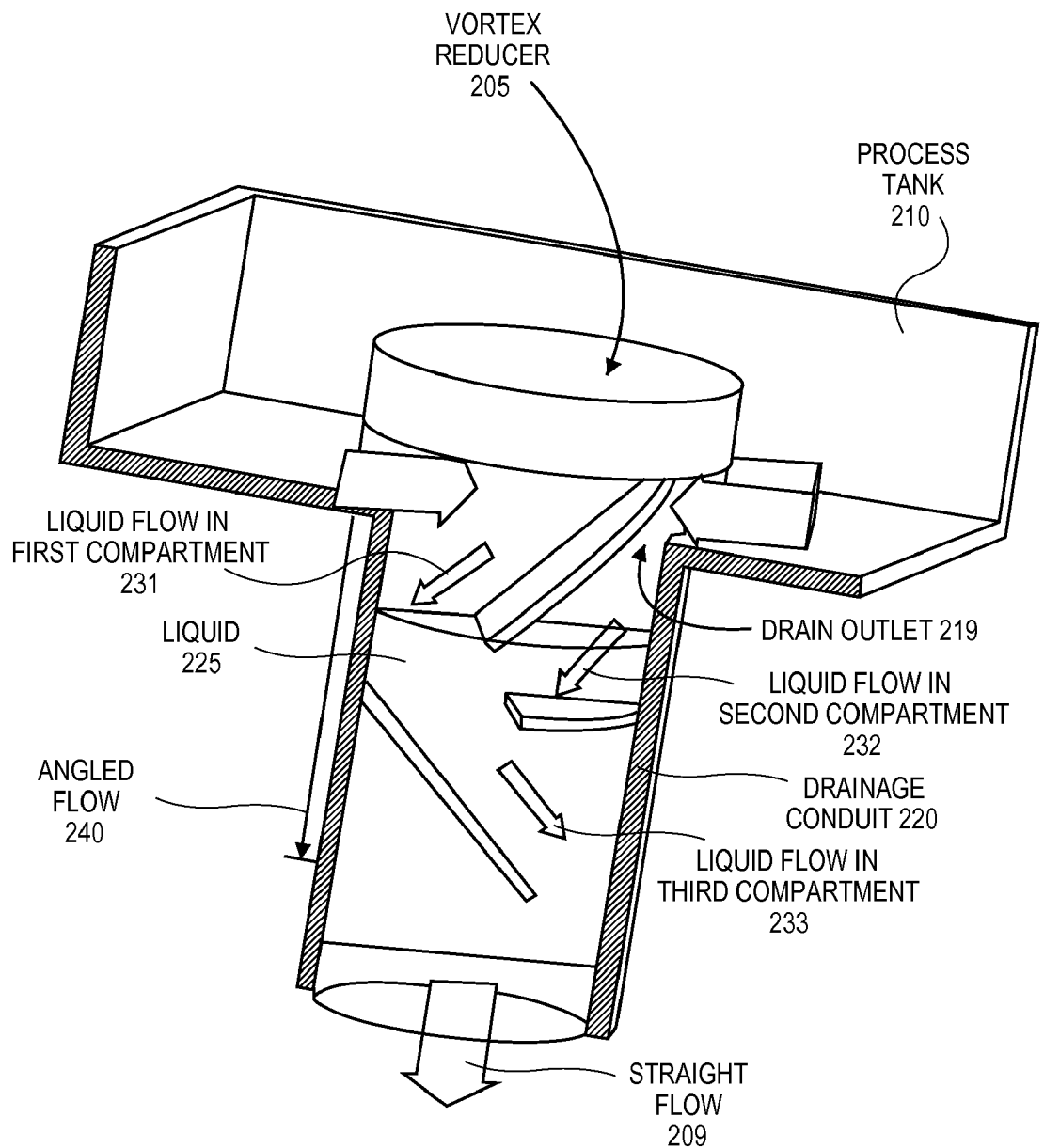
FIG. 2 illustrates one embodiment of a vortex reducing apparatus.

FIG. 2 is a cross sectional view illustrating the diverting of liquid flow drainage in a tank using a vortex reducing apparatus in accordance with an embodiment of the present invention. Process tank 210 contains a liquid 225. In one exemplary embodiment, process tank 210 represents a dip lubrication process tank and liquid 225 represents a solvent and lubricant solution. During a dip lubrication process, a disk is immersed into the process tank 210, and then pulled out to cause lubricant of a certain thickness to remain on the disk. After a certain number of disk have been processed in the process tank 210, the process tank is drained of the liquid 225 contained therein through a drain outlet 219 at a certain flow rate, for example, of approximately 15 gallons per minute (gpm).

A vortex reducing apparatus (also referred to as a vortex reducer) 205 is disposed within a drainage conduit 220 at the bottom of a process tank 210. The vortex reducer 205 is designed with plates (e.g., foils, keels, strut etc.) that are configured at different angles to form small compartments between the vortex reducer 205 and the drainage conduit 220 to guide the liquid 225 flow into the drain outlet 219 of tank 210 through the drainage conduit 220. For example, in one embodiment, the plates of the vortex reducing device 205 generate an angled liquid flow in a first compartment 231, an angled liquid flow in a second compartment 232, and an angled liquid flow in a third compartment 233. In one embodiment, the vortex reducer 205 has similar plates and compartments on its back side (not visible in the cross section view of FIG. 2), generating corresponding angled liquid flows.

Figure 3:
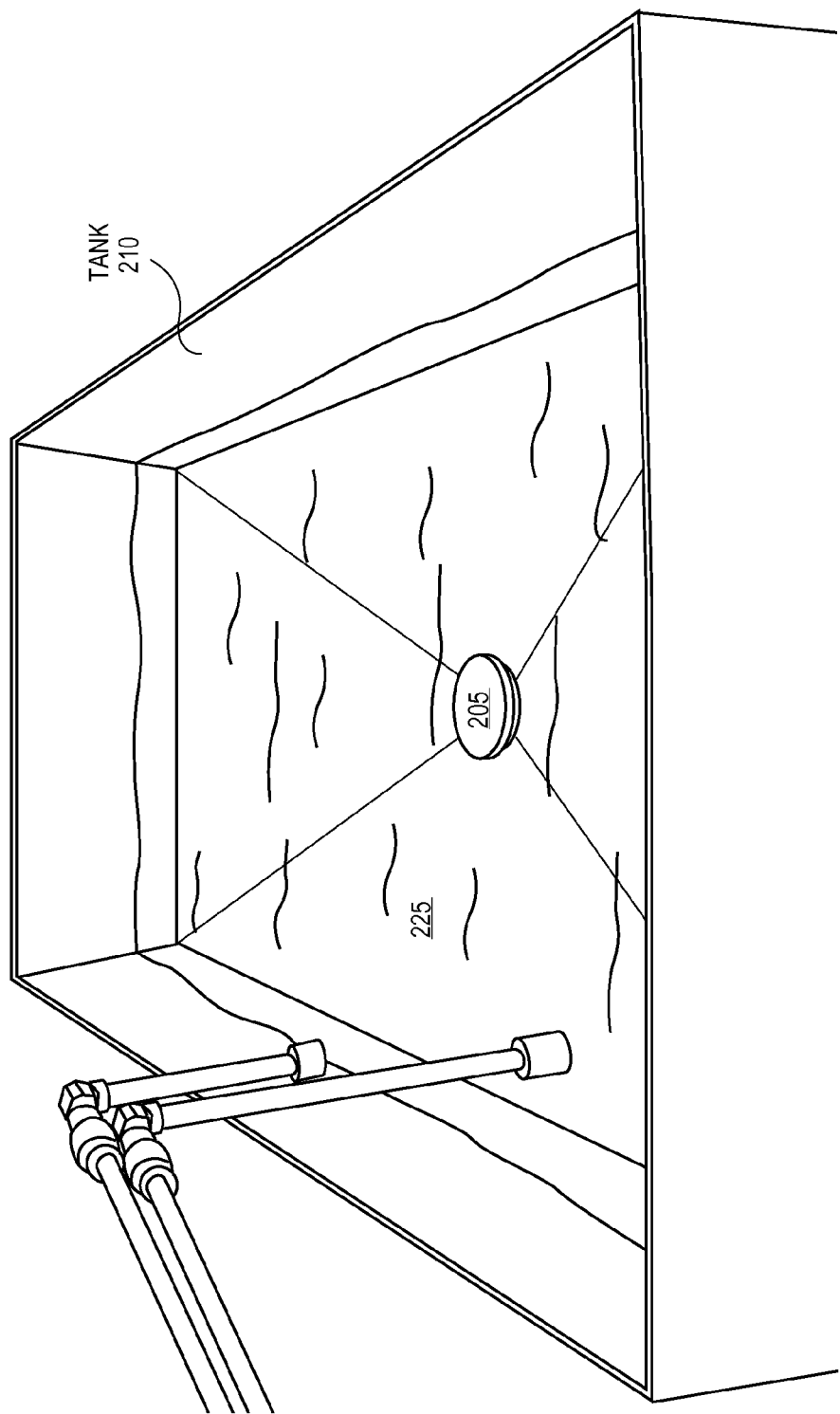
FIG. 3 illustrates the reduction of a liquid vortex in a process tank using a vortex reducing apparatus according to one embodiment of the present invention.

By diverting the flow of liquid 225 from flowing straight through the drainage conduit for a certain distance below the drain outlet 219 at the bottom of the tank (i.e., an angled flow section 240), the vortex reducer 205 slows down the flow speed of the liquid 225 through the drain outlet and, thereby, reduces the formation of a vortex during draining of the liquid 225 from the tank 210 as illustrated in FIG. 3. After passing through the vortex reducer 205, the liquid may proceed to flow straight through 209 the drainage conduit 219.

The use of vortex reducer 205 may provide for one or more of the following: shorter drain times, more consistent drain times among multiple drain operations, and reduction of the trapping of air in the drainage conduit line that runs to an electric pump (not shown) so as to avoid pump failure due to a hot run condition. Avoiding pump failures reduces pump repair costs and machine downtime to perform the pump repair. Dipper machines and their components such as tanks and electric pumps are known to those of ordinary skill in the art and are commercially available; accordingly, further details are not provided herein.

In addition, the vortex reducer 205 may be used with currently designed dipper machines, or other systems, as no process change or equipment modification is required to use the vortex reducer 205. It should be noted again that although embodiments of the vortex reducer 205 are discussed in relation to a dipper machine, the vortex reducer 205 may also be used with other types of machines and systems utilizing a tank that requires the drainage of liquid. Further details of the vortex reducer 205 are discussed below in relation to FIG. 4.

Figure 4:
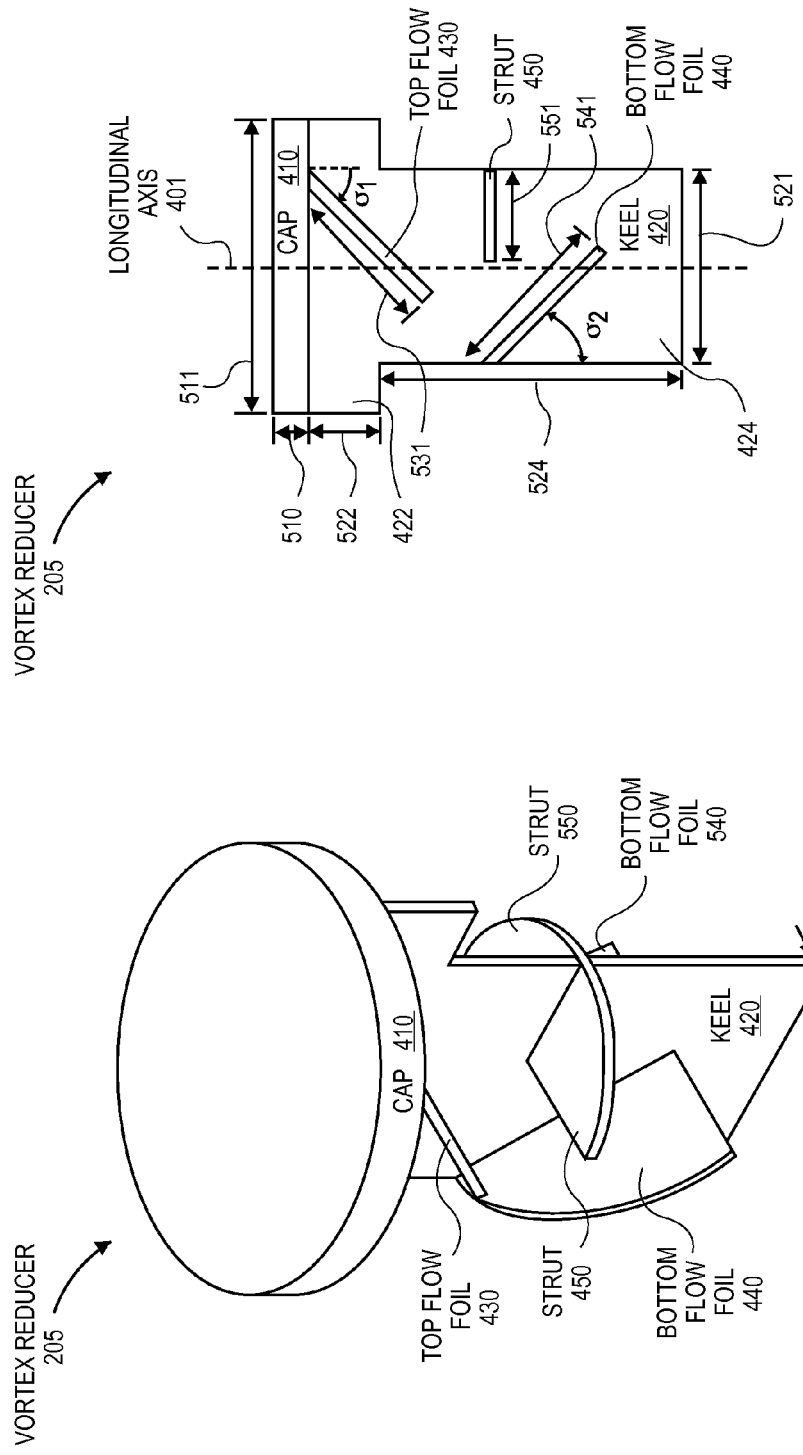
FIG. 4 is a perspective view illustrating one embodiment of a vortex reducing apparatus.

FIG. 4 is a perspective view illustrating one embodiment of a vortex reducing apparatus. In this embodiment, the vortex reducer 205 includes a cap 410 coupled to a keel 420 having a longitudinal axis 401 (shown in FIG. 5). A top flow foil 430 and a bottom flow foil 440 are coupled to the keel 420. The top flow foil 430 and the bottom flow foil 440 are each coupled to the keel 420 at a respective angle relative to the longitudinal axis 401. In one embodiment, the vortex reducer 205 may also include a strut 450 coupled to the keel at a second angle with respect to the longitudinal axis 401. In this embodiment, the top flow foil 430 and the bottom flow foil 440 are both downwardly sloping, in opposing directions, from the drain outlet 219. The first and second angles of the foils and strut are as discussed further below in relation to FIG. 5.

In one embodiment, vortex reducer 205 may have symmetrically configured foils and struts on both sides of keel 420, for example, strut 550 and bottom flow foil 540. It should be noted that the strut and foils on each side of keel 420 may be separate components or may be constructed integrally with notches cut within the keel to accept such one-piece construct components.

Figure 5:
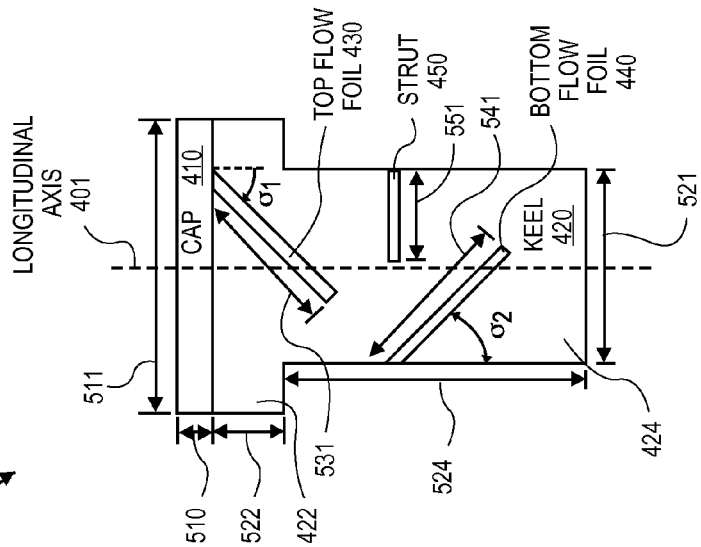
FIG. 5 is a cross sectional view illustrating exemplary dimensions of a vortex reducer according to one embodiment of the present invention.

FIG. 5 is a cross sectional view illustrating exemplary dimensions of a vortex reducer according to one embodiment of the present invention. The dashed line in FIG. 5 represents a longitudinal axis 401 which is an imaginary line running down the center of the vortex reducer that is perpendicular to the transverse plane. In one embodiment, strut 450 is oriented in the transverse plane at a 90 degree angle relative to the longitudinal axis 401. Alternatively, the strut 450 may be angled in a range of 75 to 105 degrees with respect to the longitudinal axis 401. The top flow foil 430 and the bottom flow foil 440 are also angled with respect to the longitudinal axis 401 but differently than strut 450. Each of the top flow foil 430 and the bottom flow foil 440 are angled $\theta_1$ and $\theta_2$, respectively, in a range to 35 to 55 degrees that in one embodiment, for example, is 45 degrees. As discussed above in relation to FIG. 4, the top flow foil 430 and the bottom flow foil 440 are angled, $\theta_1$ and $\theta_2$, in opposing directions to each other.

Cap 410 is coupled to an upper shoulder portion 422 of the keel 420 and is wider than the lower portion 424 of the keel 420 in order to rest on the bottom of the process tank 210 (as illustrated in FIG. 2). In one embodiment, the length of the upper shoulder portion 422 may be in a range of 12 mm to 24 mm and the length 510 of the cap may be in a range of 4 mm to 20 mm. The length 524 of the lower portion 424 may be in a range of 48 mm to 86 mm. The diameter of the cap 511 may be in a range of 30 mm to 90 mm. It should be noted that the above dimensions may be varied, in particular, based upon the width 521 of keel 420.

The width 521 of the keel 420 depends upon the diameter of the drainage 219 in which it is intended to be used. The following discussion provides some exemplary dimensions that may be used in one embodiment of the vortex reducer; however, other dimensions may also be used. In one embodiment, strut 450 has a length 551 being less than a width 521 of the keel and wherein the top flow foil 430 and the bottom flow foil has lengths 551 and 541, respectively, being less than half the width 521 of the lower portion 424 of the keel. In alternative embodiments, the strut 450 has a length 551 in a range from 20% to 75% of the width 521 of the keel; the top flow foil 430 has a length 531 in a range of 25% to 70% of the width 521 of the keel; the bottom bottom flow foil 440 has a length 541 in a range of 20% to 70% of the width 521 of the keel; and the cap 410 has a diameter 511 in a range of 105% to 300% of the width 521 of the keel. Each of the top flow foil 430, the bottom flow foil 440 and the strut 450 may have curved edges as illustrated in FIG. 4. The curved edges are designed to abut the inner surface of drainage conduit 220 and, thus, may have circular, elliptical or other shape depending on the shape of the conduit and the angle at which the plates are coupled to the keel. Each of the top and bottom foils and the strut may have a thickness (e.g., thickness 421) in a range from 1 to 3 millimeters. In one embodiment, the vortex reducer 205 is constructed from stainless steel. Alternatively, other materials may be used.

Although these embodiments have been described in language specific to structural features and methodological acts, it is to be understood that the invention defined in the appended claims is not necessarily limited to the specific features or acts described in particular embodiments.

What is claimed is:

1. A vortex reducing apparatus, comprising:
   a keel having a longitudinal axis;
   a top flow foil coupled to the keel; and
   a bottom flow foil coupled to the keel, wherein the top flow foil is coupled to the keel at a first angle with respect to the longitudinal axis and the bottom flow foil is coupled to the keel at a second angle with respect to the longitudinal axis, and wherein the first and second angles are opposing and wherein each of the first and second angles is in a range of 35 to 55 degrees.

2. The vortex reducing apparatus of claim 1, further comprising a strut coupled to the keel at a third angle with respect to the longitudinal axis, the third angle being different than the first or second angles.

3. The vortex reducing apparatus of claim 1, wherein each of the first and second angles is 45 degrees.

4. The vortex reducing apparatus of claim 2, wherein the third angle is a range of 75 to 105 degrees.

5. The vortex reducing apparatus of claim 4, wherein the third angle is 90 degrees.

6. The vortex reducing apparatus of claim 2, wherein the top and bottom foils and the strut each have a thickness in a range from 1 to 3 millimeters.

7. The vortex reducing apparatus of claim 2, further comprising a cap coupled to an upper shoulder portion of the keel being wider than a lower portion of the keel.

8. The vortex reducing apparatus of claim 7, wherein the strut and the bottom flow foil are coupled to the lower portion of the keel and wherein the top flow foil is coupled to both the upper shoulder portion and the lower portion of the keel.

9. The vortex reducing apparatus of claim 8, wherein the strut has a length being less than a width of the keel and wherein each of the top and bottom flow foils has a length being less than half a width of the lower portion of the keel.

10. The vortex reducing apparatus of claim 2, wherein each of the top flow foil, the bottom flow foil and the strut have curved edges.

11. The vortex reducing apparatus of claim 9, wherein the cap has a diameter being greater than the width of the lower portion of the keel.

12. A process tank, comprising:
a drainage conduit coupled to a drain outlet disposed at a bottom of the process tank; and
a vortex reducing apparatus disposed in the drain outlet and extending into the drainage conduit below the drain outlet, wherein the vortex reducing apparatus comprises:
a keel having a longitudinal axis;
a top flow foil coupled to the keel; and
a bottom flow foil coupled to the keel, wherein the top flow foil is coupled to the keel at a first angle with respect to the longitudinal axis and the bottom flow foil is coupled to the keel at a second angle with respect to the longitudinal axis and wherein the first and second angles are opposing and wherein each of the first and second angles is in a range of 35 to 55 degrees.

13. The process tank of claim 12, wherein the top and bottom flow foils of the vortex reducing device are downwardly sloping, in opposing directions, from the drain outlet.

14. The process tank of claim 13, wherein the vortex reducing apparatus further comprise a strut coupled to the keel at a third angle with respect to the longitudinal axis, the third angle being different than the first angle.

15. The process tank of claim 14, wherein the vortex reducing apparatus further comprises a cap coupled to an upper shoulder portion of the keel being wider than a lower portion of the keel, and wherein the strut and the bottom flow foil are coupled to the lower portion of the keel and wherein the top flow foil is coupled to both the upper shoulder portion and the lower portion of the keel, and wherein the upper shoulder portion of the keel rests on the bottom of the process tank.

16. The process tank of claim 15, wherein cap resides above the bottom of the tank a distance equal to a length of the shoulder portion of the keel, wherein the length of the shoulder portion of the keel is in a range of 12 to 24 millimeters.

17. A method of reducing formation of a vortex in a drainage of a liquid from a tank, comprising:
initiating the drainage of the liquid from the tank through a drain outlet at a bottom of the tank into a drainage conduit; and
diverting the liquid from flowing straight through the drainage conduit below the bottom of the tank to slow down a flow speed of the liquid through the drain outlet using a vortex reducer disposed in the drain outlet and extending into the drainage conduit, wherein the vortex reducer comprises:
a keel having a longitudinal axis;
a top flow foil coupled to the keel; and
a bottom flow foil coupled to the keel, wherein the top flow foil is coupled to the keel at a first angle with respect to the longitudinal axis and the bottom flow foil is coupled to the keel at a second angle with respect to the longitudinal axis and wherein the first and second angles are opposing and wherein each of the first and second angles is in a range of 35 to 55 degrees.

18. The method of claim 17, wherein diverting the liquid comprises generating angled flows of liquid through one or more compartments formed by the drainage conduit and the vortex reducer.

19. The method of claim 18, wherein the vortex reducer further comprises a strut coupled to the keel at a third angle with respect to the longitudinal axis, the third angle being different than the first angle.

* * * * *